United States Patent [19]

Dew

[11] Patent Number: 5,322,726
[45] Date of Patent: Jun. 21, 1994

[54] COEXTRUDED FILM HAVING HIGH OXYGEN TRANSMISSION RATE

[75] Inventor: Jimmy S. Dew, Milford, Ohio

[73] Assignee: James River Paper Company, Inc., Milford, Ohio

[21] Appl. No.: 34,914

[22] Filed: Mar. 19, 1993

[51] Int. Cl.$^5$ .............................................. B32B 7/02
[52] U.S. Cl. .................................... 428/216; 426/127; 428/349; 428/516
[58] Field of Search ...................... 428/349, 516, 216; 426/127

[56] References Cited

U.S. PATENT DOCUMENTS 4,657,610  4/1987  Komatsu et al. ................... 428/137
4,935,271  6/1990  Schirmer .............................. 428/349

*Primary Examiner*—Edith Buffalow
*Attorney, Agent, or Firm*—Stanley M. Teigland

[57] ABSTRACT

A coextruded film having an oxygen transmission rate between about 160 and 375, making it especially suitable for packaging fresh produce, comprises a skin layer of polypropylene, a core layer of ethylene-vinyl acetate copolymer, and a heat seal layer of ultra linear low density polyethylene.

7 Claims, No Drawings

COEXTRUDED FILM HAVING HIGH OXYGEN TRANSMISSION RATE

This invention is a coextruded film that is especially suitable for packaging fresh produce such as lettuce and cabbage, which may be in the form of a salad or cole slaw. Such produce is now commonly packaged in sealed bags made from a plastic film having an oxygen transmission rate that agrees with the respiration rate of the vegetables so that the shelf life of the vegetables is extended. This invention provides such a film.

The film of this invention has an oxygen transmission rate (OTR) between about 160 and 375 cc/100 square inches/24 hours measured in accordance with ASTM D3985-81. The OTR depends on the thickness of the film. The films of this invention preferably have a thickness between about 1.25 and 2.75 mils. Films having a thickness in the lower half of this range are especially suitable for packaging cabbage, including cole slaw, and films in the upper half of the range are especially suitable for packaging lettuce, including salad comprising mostly lettuce.

The film of this invention has a heat-resistant skin layer comprising polypropylene having from zero to six percent ethylene copolymerized therewith, a core layer comprising a copolymer of ethylene and vinyl acetate, and a heat seal layer comprising ultra linear low density polyethylene. Each skin layer preferably comprises between about 15 and 40 percent of the thickness of the film and the core layer comprises from about 40 to 60 percent of the thickness.

The film may be made by either the blown or cast extrusion process. If made by the blown process, the polypropylene preferably has from three to six percent ethylene randomly copolymerized therewith because such polypropylene provides better optical properties (clarity and gloss) in the blown film process. The film of this invention has good clarity (less than 15 percent haze) and gloss (greater than 35 percent), which are important for consumer appeal. If the film is made by the cast process, the polypropylene is preferably propylene homopolymer. In either case, the skin layer formed by the polypropylene is heat resistant, which means that it is not adversely affected by the heat imparted to the film by the sealing jaws used to heat seal the film when it is formed into a sealed bag. The jaws are typically heated to a temperature between about 180° and 240° F. The melt flow rate of the polypropylene is preferably between about 1.5 and 3.0. Melt flow rate is measured in accordance with ASTM D-1238 Condition L.

The ethylene-vinyl acetate copolymer preferably has a vinyl acetate content between about 9 and 15 percent. If the film is made by the blown process, the copolymer preferably has a melt index between about 0.2 and 0.4 in order to provide good bubble stability. The melt index is preferably between about 1.5 and 3.0 if the film is made by the cast process. Melt index is measured in accordance with ASTM D-1238, Condition E.

The heat seal layer preferably has a heat seal activation temperature of between about 170° and 190° F. The layer may comprise a single ultra linear low density polyethylene (ULLDPE), especially if the ULLDPE is a so-called second generation ULLDPE, which is made using a single catalyst. Second generation ULLDPE is available commercially from Exxon and Dow under the trademarks EXACT and INSITE, respectively. If the heat seal layer comprises a first generation ULLDPE, it is preferably blended with a minor amount (less than 50 percent) of another ULLDPE which is referred to in the art as a plastomer. ULLDPE is a linear polyethylene having a density between about 0.880 and 0.915. It is made by polymerizing ethylene with up to ten percent of an alpha-olefin having four to eight carbon atoms, such as butene, hexene or octene. The melt index of the ULLDPE is preferably between about 2 and 4.

EXAMPLE

A coextruded film having three layers was made by the blown film process. The film had a thickness of 2.5 mils, of which each skin layer represented 20 percent and the core layer represented 60 percent. The core layer consisted of an ethylene-vinyl acetate copolymer having a vinyl acetate content of 12 percent and a melt index of 0.25. One skin layer consisted of a random copolymer of propylene and 4 percent ethylene having a melt flow rate of 2. The other skin layer consisted of a first generation ULLDPE having a density 0.912 blended with 40 percent of an ULLDPE plastomer (EXXON 4011). The film, which had an OTR of 200 cc, was formed into a bag, filled with lettuce, and heat sealed. The bag provided excellent results in presenting and maintaining the quality of the lettuce.

I claim:

1. A coextruded film having an oxygen transmission rate between about 160 and 375 cc/100 square inches/24 hours, said film having a temperature-resistant skin layer comprising polypropylene having from zero to six percent ethylene copolymerized therewith, a core layer comprising a copolymer of ethylene and vinyl acetate, and a heat sealable skin layer comprising ultra linear low density polyethylene, wherein the film has a thickness between about 1.25 and 2.75.

2. The film of claim 1 wherein each skin layer comprises from about 15 to 40 percent of the thickness of the film and the core layer comprises from 40 to 60 percent of the thickness.

3. The film of claim 2 wherein the vinyl acetate content of the ethylene-vinyl acetate copolymer is between about 9 and 15 percent.

4. The film of claim 3 wherein the heat seal layer has a heat seal activation temperature between about 170° and 190° F.

5. The film of claim 4 having a haze of less than 15 percent and a gloss of more than 35 percent.

6. The film of claim 5 wherein the film is made by the blown film process and the copolymer of ethylene and vinyl acetate has a melt index between about 0.2 and 0.4.

7. The film of claim 6 wherein the polypropylene has from three to six percent ethylene copolymerized therewith.

* * * * *